United States Patent
Weiner

(10) Patent No.: US 6,983,198 B2
(45) Date of Patent: Jan. 3, 2006

(54) ONBOARD SATELLITE PROCESSING TO MITIGATE DATA RECORDER LIMITS

(75) Inventor: Allan M. Weiner, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 90 days.

(21) Appl. No.: 10/672,583

(22) Filed: Sep. 26, 2003

(65) Prior Publication Data

US 2005/0071054 A1    Mar. 31, 2005

(51) Int. Cl.
*G06K 9/46*    (2006.01)

(52) U.S. Cl. ............... 701/13; 244/158 R; 342/26 A; 342/60; 348/144; 702/3; 702/5

(58) Field of Classification Search .......... 701/13, 701/226; 244/158 R; 342/60, 26 A; 348/144; 702/3, 5
See application file for complete search history.

(56) References Cited

U.S. PATENT DOCUMENTS

| | | | |
|---|---|---|---|
| 4,465,940 A | | 8/1984 | Graff et al. |
| 5,248,979 A | * | 9/1993 | Orme et al. ................. 342/58 |
| 5,323,317 A | * | 6/1994 | Hampton et al. .............. 702/3 |
| 5,329,595 A | * | 7/1994 | Davies ...................... 382/103 |
| 5,596,494 A | * | 1/1997 | Kuo ............................ 702/2 |
| 5,612,901 A | * | 3/1997 | Gallegos et al. .............. 702/3 |

* cited by examiner

Primary Examiner—Michael J. Zanelli
Assistant Examiner—Eric M. Gibson
(74) Attorney, Agent, or Firm—Sacco & Associates, PA

(57) ABSTRACT

A spacecraft (102) can include a communications receiver (210) for receiving a selected list of targets (114, 116) for which desired information is to be acquired by the spacecraft (102). In addition to location data concerning the targets, the list can also include a predetermined priority value assigned to each target on the list. The list can include data acquisition targets that collectively comprise more data than can be stored on the spacecraft's onboard solid state recorder (204). One or more computer processors (206) can be also be provided onboard the spacecraft. The processor (206) can process the acquired data onboard the spacecraft to determine whether the data contains at least a predetermined portion of the desired information and can overwrite lesser priority data (316) when the solid state recorder (204) is otherwise full.

34 Claims, 4 Drawing Sheets

Target List

| Target | Priority | Threshold |
|---|---|---|
| Target 1 | high | 20% |
| Target 2 | high | 20% |
| Target 3 | medium | 50% |
| Target 4 | low | 75% |
| Target 5 | high | 50% |

Fig. 4

ONBOARD SATELLITE PROCESSING TO MITIGATE DATA RECORDER LIMITS

BACKGROUND OF THE INVENTION

1. Statement of the Technical Field

The inventive arrangements relate generally to the field of satellite systems, and more particularly to systems for mitigating the limitations of onboard satellite data recorders.

2. Description of the Related Art

Earth satellites are used for a wide variety of civilian and military purposes. In the civilian realm, these purposes can include weather, communications, mapping, and resource exploration. Satellite operators often assign certain predefined tasks to an orbiting satellite. These tasks can include memory intensive applications including the collection of data such as imagery, signal handling, and so on. A list of targets for data collection often must be predefined by the operator as the satellite may not always be in range of a ground control station. The data is generally recorded to a computer memory device and then relayed to a ground station at a convenient time.

In recent years, state-of-the-art electronics provide satellites with greater memory capacity and flexibility through the use of solid state recorders (SSRs). These SSRs can have a greater capacity as compared to older electro-mechanical systems such as tape drives. They also offer greater flexibility as compared to less advanced systems by permitting record and play back of data simultaneously. Another advantage of the SSR is the ability to record multiple data streams at the same time. Further, data recorded to an SSR can be instantly accessed.

One problem encountered by satellite operators relates to the selection of targets and the limited available data memory/storage on-board the spacecraft. In particular, satellite operators often desire to increase the list of potential targets without exceeding the limited data storage capacity available on-board the spacecraft. Despite the many advantages of the SSR, the total volume of data that can be stored often remains a limiting factor.

In conventional satellite systems, a list of selected targets is uploaded to the satellite. The satellite then acquires the data in a serial fashion. As noted above, the operator who compiles the list is limited by the satellite data storage capacity. In an effort to address these considerations, current state-of-the-art satellite targeting systems conventionally make use of a decision tree of targets to acquire based on several factors. These factors can include 1) mission priority, 2) spacecraft momentum considerations, 3) weather, and other factors. Consequently, high priority targets can in some instances be eliminated from the target list if the probability of successful acquisition is deemed to be low. Further, some data that is acquired may later be deemed to be of little or no value if, when the satellite arrives at the target, it is discovered that the target is absent from its anticipated location, obscured, and so on. Despite the absence of useful information, data is acquired at the target location and stored in the satellite's storage, thereby wasting valuable memory resources.

In the past, satellite resources have been considered so valuable that even completely useless data has been saved for future, unknown uses. The paradigm has been that nothing should be discarded. Further, data processing onboard satellites has been relatively minimal in the past. Consequently, the ability to diagnose the usefulness of the acquired data was essentially non-existent. Further, many prior art data recorder systems used on board satellites have not had the ability to rewind and overwrite data without interrupting satellite operations. Accordingly, there was no practical ability to review and discard data in real time.

SUMMARY OF THE INVENTION

The present invention concerns a method for increasing an amount of useful data collected by a spacecraft such as an earth satellite. The method can begin by selecting a list of targets for which desired information is to be automatically acquired by said spacecraft. Predetermined priority value can be assigned to each target on the list of targets at the time the list is created. This list of targets can be communicated to the spacecraft which thereafter can operate essentially autonomously. Based upon the list of targets, the spacecraft can acquire data anticipated to correspond to said desired information for at least one of the targets on the list with or without regard to the anticipated surveillance conditions and/or predetermined priority value that has been assigned.

The acquired data is automatically processed on-board the spacecraft to determine whether the data contains at least a predetermined portion of the desired information. For example, the spacecraft can acquire data concerning targets on the target list even where the imagery is forecast to be obscured by clouds. In that case, the processing on board the spacecraft can include applying a cloud detection algorithm to the acquired data to determine whether the data contains at least the predetermined portion of the desired information. The spacecraft thereafter can automatically discard the data if it does not contain at least the predetermined portion of the desired information.

Alternatively, the spacecraft can acquire RF signal data where it is uncertain that the signal-to-noise ratio will be sufficient to allow useful data to be extracted from the signal. In that case, the processing onboard the spacecraft can include applying noise-reduction algorithms to the acquired data to determine whether it contains at least the predetermined portion of the desired information. According to yet another embodiment, the spacecraft can acquire RF signal data where it is not certain that the signal data will contain a voice of a particular individual or a particular type of data. In that case, voice recognition algorithms can be used to determine whether the particular individual's voice is contained within the RF signal data. Data decoders can be used to identify other types of data transmissions in order to determine whether they contain useful information.

The method can also include the step of selecting the list of targets so that a total volume of data associated with the list of targets for which the desired information is to be acquired is known to exceed a data storage capacity of the spacecraft. Thereafter, the spacecraft can acquire data anticipated to correspond to desired information for each of the targets on the list with or without regard to priority until a data storage capacity of the spacecraft is exceeded. The data can be recorded in a data storage or computer memory. Thereafter, the spacecraft can discard the recorded data acquired for any one of the targets if the target has a priority value lower than a priority valued assigned to one of the target for which data is subsequently acquired.

The invention can also include a spacecraft for increasing an amount of useful data collected. The spacecraft can include a communications receiver for receiving a selected list of targets for which desired information is to be acquired by the spacecraft. In addition to location data concerning the targets, the list can also include a predetermined priority value assigned to each target on the list. One or more computer processors can be also be provided on board the spacecraft. The one or more processors can be responsive to the selected list of targets for controlling the spacecraft to acquire data anticipated to correspond to the desired information for at least one of the targets on the list. The processor can also process the acquired data on-board the spacecraft to determine whether the data contains at least a predetermined portion of the desired information. The processor can automatically discard the data if it does not contain at least a predetermined portion of the desired information.

The spacecraft can acquire data concerning targets on the target list even where the imagery is forecast to be obscured by clouds. In that case, the processor can be provided with a cloud detection algorithm to determine whether the acquired data contains at least the predetermined portion of the desired information. The onboard processor can then cause the spacecraft to automatically discard the data if it does not contain at least the predetermined portion of the desired information.

The system can also include one or more mass data storage devices wherein acquired target data is recorded. One or more computer processors can cause the spacecraft to collect data anticipated to correspond to desired information for each of the targets on the list with or without regard to the priority value. However, in some instances where the data is collected without regard for priority, a volume of data associated with the list of targets for which the desired information is to be acquired exceeds a capacity data storage device. In that case, the spacecraft can automatically discard the recorded data acquired for any one of the lower priority targets to automatically make room for a new higher priority target.

BRIEF DESCRIPTION OF THE DRAWINGS

FIG. 4 is an example of a target list.

DETAILED DESCRIPTION OF THE PREFERRED EMBODIMENTS

Figure 1:
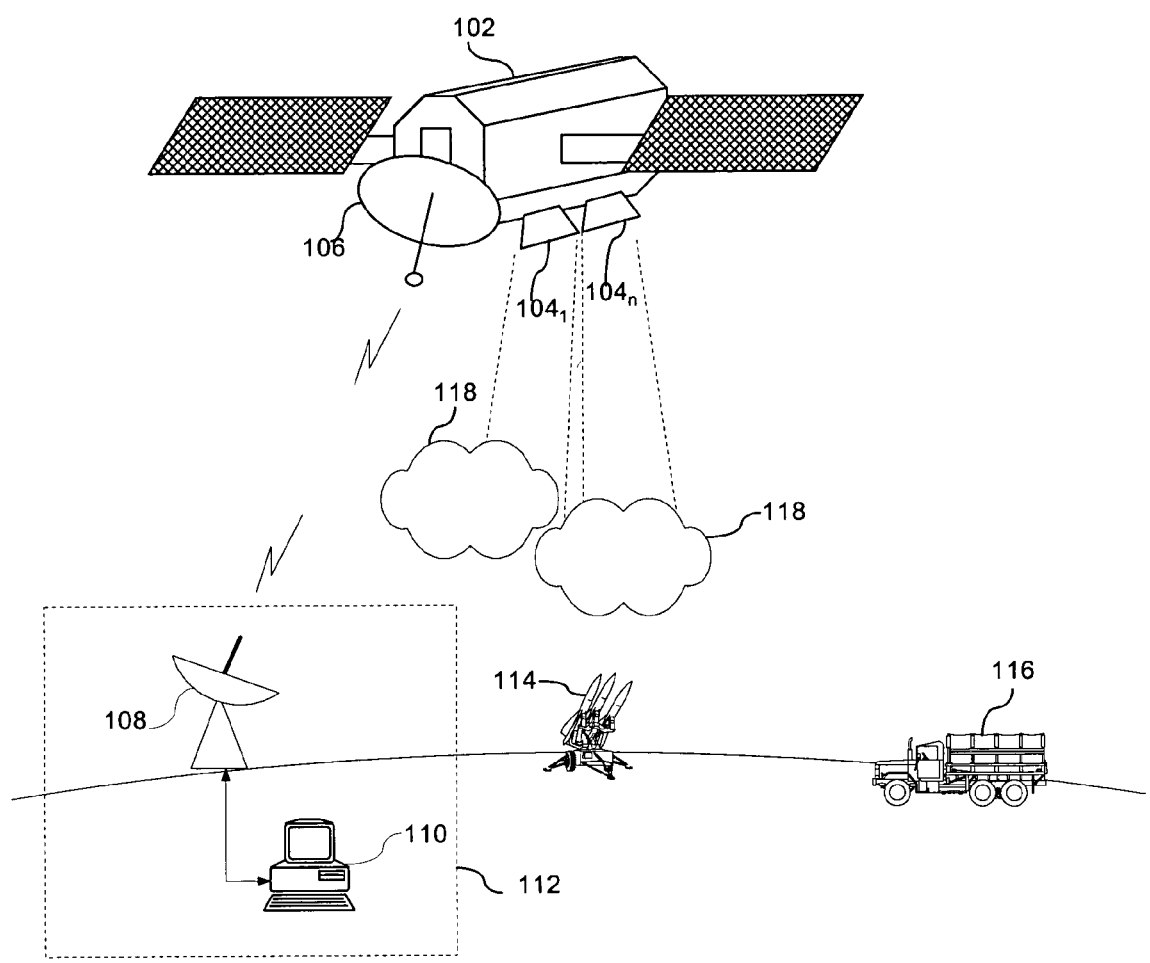
FIG. 1 is a schematic illustration showing a surveillance satellite in orbit.
Figure 2:
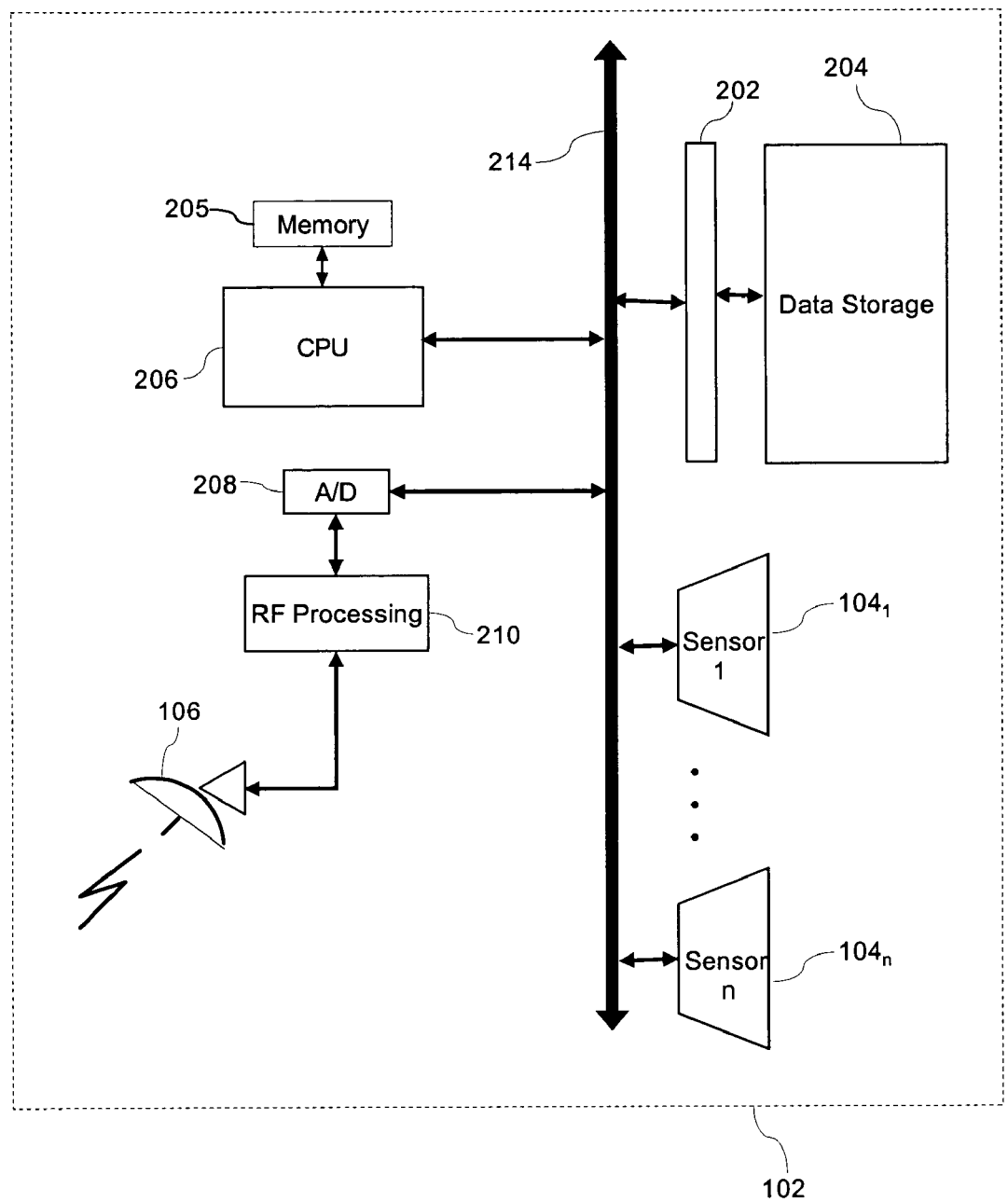
FIG. 2 is a block diagram of the surveillance satellite in FIG. 1.

A system for mitigating spacecraft data recorder limits is illustrated in FIGS. 1 and 2. The system can include a spacecraft 102 designed for collecting surveillance or scientific data. The spacecraft 102 can be an earth orbiting satellite, interplanetary probe, or any other autonomous or semi-autonomous space vehicle that automatically collects information based on a list of predetermined targets, such as targets 114, 116, provided by a ground control station 112. One or more sensors $104_1$ through $104_n$ can be provided for collecting the data. Sensors $104_1$ through $104_n$ can be any suitable sensor element for collecting the particular type of information that is of interest with regard to the mission of the space vehicle. For example, the sensors can be digital cameras, infrared imagers, individual antenna elements or arrays of antennas for receiving RF signals, radar imagers and so on. Occasionally, the spacecraft 102 can be prevented from acquiring 100% of the desired information associated with a target due to various conditions. For example, a target 114 can be obscured by cloud cover as shown in FIG. 1. Similarly, RF signal sources can be obscured by noise, jammers and other mechanisms.

Spacecraft 102 can have one or more ground link communications antennas 106 for receiving command and control information from ground control station 112. The ground station can include one or more computers 110 linked to a ground station antenna 108 for communicating with the space vehicle using a conventional radio link. Basic space craft command and control systems as have been described herein thus far are well known in the art.

Referring now to FIG. 2, it will be appreciated that the exemplary architecture of spacecraft 102 illustrated therein is provided only for facilitating an improved overall understanding of the inventive concepts. Those skilled in the art will appreciate that the invention is not limited in any way with regard to the particular architecture shown, it being understood that many variations are possible and all such variation are intended to be within the scope of the invention.

As shown in FIG. 2, ground link communication antenna 106 can be coupled to an RF stage for performing any necessary RF processing. The RF signals can be converted to a digital format in an analog to digital (A/D) converter as is known in the art. The command and control information can be communicated to processor (CPU) 206 which can include any necessary memory 205. A single CPU 206 can be provided for performing all necessary processing operations on board the spacecraft. For example processor 206 can be responsive to a selected list of targets for controlling the spacecraft 102 to acquire data anticipated to correspond to the desired information for at least one of the targets on the list. Processor 206 can also analyze the acquired data on-board the spacecraft to determine whether the data contains at least a predetermined portion of the desired information. Alternatively, the various processing tasks can be divided among a plurality of computer processors. Command and control processing can be handled by a first processor, such as processor 206 whereas sensor data analysis processing can be performed by a separate data processor. As used herein, the term "processor" refers to any combination of one or more computer processors, associated memory, and computer programming capable of performing the identified processing task as shall be hereinafter described, it being understood that one processor can perform multiple processing tasks.

A suitable mass data storage device 204 and memory interface 202 can be provided on board the spacecraft 102 for storing sensor data collected by the spacecraft. Command and control software for the spacecraft, as well as any necessary communications and data processing software can also be stored in mass data storage device 204. Alternatively, a separate storage, not shown, can be provided. The data storage device 204 can include any space compatible mass data storage system. For example, many satellites now make use of conventional solid state recorders (SSR) for recording large amounts of data. These SSRs can have a greater capacity as compared to older electromechanical systems such as tape drives. They also offer greater flexibility as compared to less advanced systems by permitting record and play back of data simultaneously. Another advantage of the SSR is the ability to record multiple data streams at the same time. Further, data recorded to an SSR can be instantly accessed.

At least one system bus 214 can be provided to facilitate communications among the various components of the spacecraft 102 including CPU 206, data storage system 204, sensors $104_1$ through $104_n$. The system bus 214 can be any one of a variety of well known computer bus systems that allow for the efficient communication of data and other system commands.

According to a preferred embodiment, a controller at ground control station 112 can generate a list identifying specific targets of interest. Examples of two such targets are identified in FIG. 1 as targets 114 and 116. The list can include priority data for identifying the relative importance assigned to the acquisition of the target data. Those skilled in the art will appreciate that surveillance targets can be widely spaced geographically so as to require space vehicle 102 to be located at two distinct locations for acquire data relating to each target. The data acquisition conditions may be different at each location. For example, some locations may be obscured by cloud cover as shown in FIG. 1.

The ground controller can select a minimum predetermined portion of the information associated with each target that must be acquired in order for the data to be deemed useful. This minimum predetermined portion can be a threshold based on a variety of different factors depending upon the mission. For example, a system operator could establish that at least 50% of a target area must be free of cloud cover in order for any acquired image data to be useful. This predetermined value could be established as a threshold for all image data collected. Alternatively, different preset threshold values could be selected for various targets. For example, those targets of greater importance could be chosen to have predetermined thresholds that allow for greater obscuration. According to a preferred embodiment, the spacecraft 102 can automatically discard the data if it does not contain at least a predetermined portion of the desired information.

With the ability to provide on board analysis regarding the relative usefulness of acquired data, the limitations of the SSR are substantially mitigated. For example, the spacecraft 102 can acquire data concerning targets on the target list even where the imagery is forecast to be obscured by clouds. In that case, the processor can process the target data making use of a cloud detection algorithm to determine whether the acquired data contains at least the predetermined portion of the desired information. The cloud detection may be accomplished by a variety of methods. One example, but not the only method, is to difference the radiant energy signals of multiple channel frequencies. When the difference exceeds a threshold, a cloud is assumed to be at that location. The spacecraft onboard processor can then cause the spacecraft to automatically discard the data if it does not contain at least the predetermined portion of the desired information.

Figure 3:
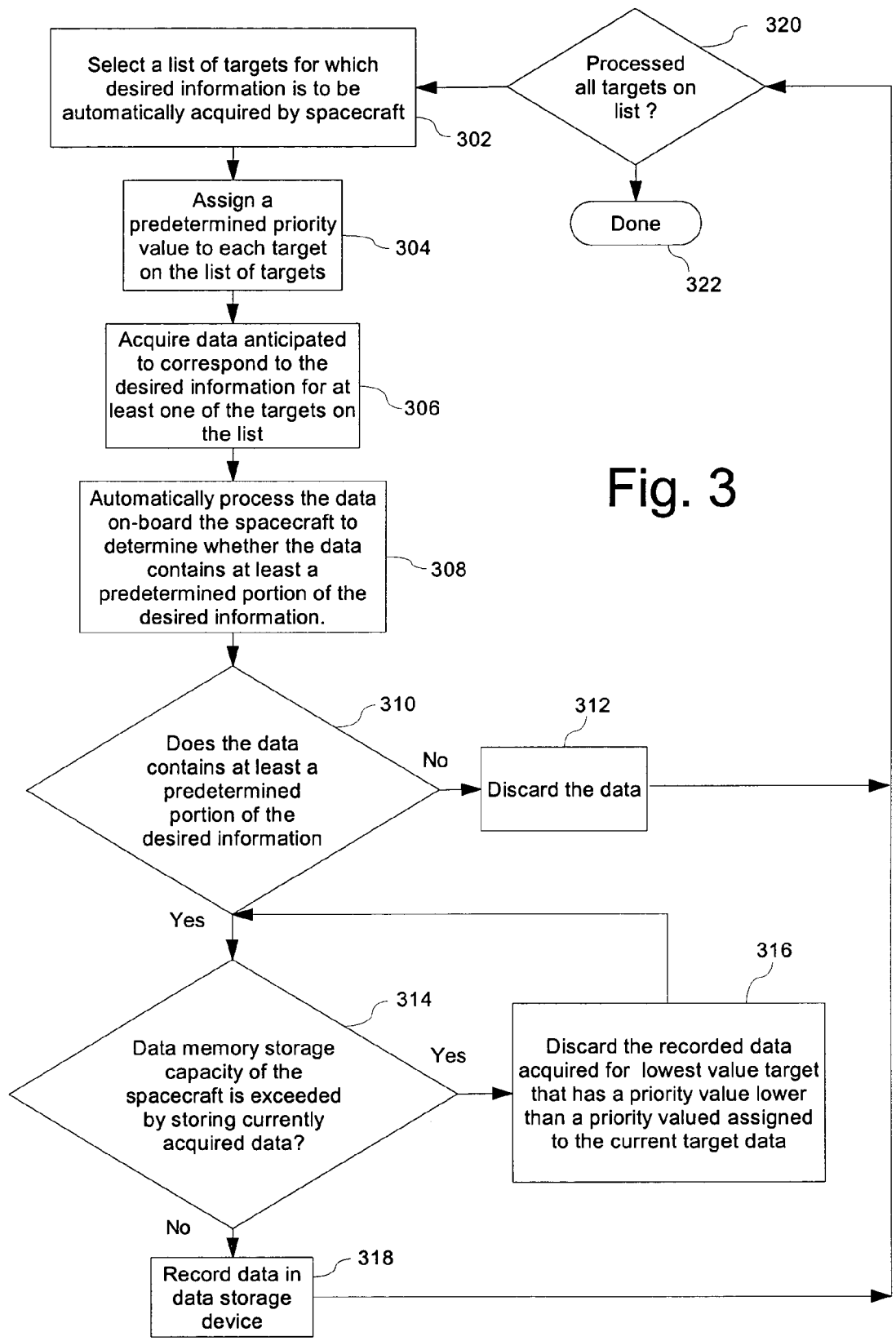
FIG. 3 is a flow chart that is useful for understanding a process for mitigating data recorder limits.

Referring now to FIG. 3, a flowchart is shown that is useful for understanding a process for mitigating the SSR data capacity limitation. The process can begin in step 302 by generating a list of targets for which desired information is to be acquired autonomously or semi-autonomously by the spacecraft 102. The desired information can be of any type, including imagery and communication intercepts from various sources. According to one embodiment, the list can be created by operators prior to launch of the spacecraft and recorded in an onboard storage device. According to a preferred embodiment, however, the list can be modified remotely by the spacecraft operators using a radio command and control link as shown in FIG. 1. The list can identify the location of the target. In step 304, the operator list can also identify and include on the list the relative priority of each target as compared to other targets on the list. FIG. 4 is an example of a target list.

At least one threshold parameter is also provided to the spacecraft for establishing a minimum predetermined portion of the desired information that must be present in the data acquired by the spacecraft in order for such data to be considered useful. For example, the threshold can be represented as a percentage value as shown in FIG. 4. In that case, a threshold value of 100% can serve as an indication that that all of the desired information must be present in the acquired data in order for the data to satisfy the threshold requirement. Conversely, a threshold value of 10% can mean that the acquired data can be acceptable even if it only contains as little as 10% of the desired information.

The threshold parameter can be a fixed value for all targets, can vary from target to target, or it can be selected by the control operator for each target for each mission. If selected by the control operator, the threshold parameter can be varied for each target, depending upon the circumstances. For example, in some instances, information regarding a particular target can be considered to be so valuable that the threshold parameter can be set very low. In such cases, even a very small amount of the desired information present in the acquired data can be a sufficient basis to consider such acquired data as valuable.

In step 306, the spacecraft can proceed to acquire the data that is anticipated to correspond to the desired information for the targets on the list. This step can involve controlling the sensors $104_1$ through $104_n$, controlling the attitude and position of the spacecraft and performing any other actions as may be needed to acquire the desired information. In the case where RF intercept data is desired, it can be desirable to steer one or more antenna beams. In the case where imaging data is desired, the onboard imaging system can be controlled to acquire one or more images of each target. Notably, the spacecraft can be required to perform many of these tasks autonomously or semi-autonomously as the spacecraft can be out of range of a ground control station when acquiring surveillance or scientific data.

The acquired data can be temporarily stored in a memory 205 or can be stored directly in a mass data storage such as data storage device 204 if space is available. In any case, the acquired data can be analyzed in step 308 to determine whether it contains at least some predetermined portion of the desired information, for example as indicated by the threshold parameter assigned to the target. The analysis in step 308 can be performed by spacecraft onboard processing resources For example, processor 206 can be used for this purpose.

Any suitable analytical process can be applied to the acquired target data in step 308 for evaluating such data to determine whether it contains the predetermined portion of the desired information. The particular analysis applied will naturally depend upon the nature of the target and the information being acquired. For example, in the case where the acquired data is imagery, cloud cover at the target location can obscure all or part of the target. Accordingly, the analytical process can evaluate the portion of the target area that is obscured by clouds. For example, in the target list shown in FIG. 4, if Target 3 is an image, cloud analysis performed on the acquired data could reveal that 75% of the target image is free of obscuration by clouds. In the case where the spacecraft 102 is performing RF intercepts of radio communications, the processor 206 can evaluate signal to noise ratios of received signals, decode intercepted data transmissions, and perform voice recognition analysis, or any other signal analysis process appropriate to determine how much of the desired target information is actually contained within the acquired signal data. In this case of voice recognition analysis, the RF transmissions can be analyzed to determine if particular words or voices are contained therein. The invention is not limited to any particular process for evaluating how much of the desired target information is actually contained in the acquired target data. Further, this process can include a determination of whether a particular type of data is the desired type, e.g. missile test telemetry versus routine traffic. There are many known ways and methodologies by which such analysis can be performed, all of which are within the scope of the present invention.

In step 310, the processor 206 can determine whether the acquired data contains at least that predetermined portion of the desired information as may be set by the threshold value. If the acquired data does not satisfy the threshold requirement (acquired data has less than the minimum required amount of desired information), the data can be discarded in step 312. If the acquired data does satisfy the threshold value, then the process continues on to step 314.

In step 314, the system can check to determine whether the data storage capacity of the spacecraft has been exceeded. For example, the system can check to see if the storage capacity of data storage 204 is exceeded by the most recently acquired target data. If so, the system can in step 316 discard the recorded data previously acquired for the lowest priority target already stored in the data storage 204 to increase the available data storage capacity. The system then returns to step 314 to verify that the data storage capacity is not exceeded by storing the currently acquired data. If not, then the acquired data is stored in step 318 and the system proceeds to the next target in step 320. If all targets in the list have been processed, the process can terminate in step 322 to await further targeting instructions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method for increasing an amount of useful data collected by a spacecraft comprising:
    selecting a list of targets for which desired information is to be automatically acquired by said spacecraft;
    acquiring data anticipated to correspond to said desired information for at least one of said targets on said list;
    automatically processing said data on-board said spacecraft to determine whether said data contains at least a predetermined portion of said desired information; and
    automatically discarding said data on-board said spacecraft if it does not contain at least a predetermined portion of said desired information.

2. The method according to claim 1 wherein said desired information is imagery and further comprising the step of acquiring data for targets on said target list where said imagery is forecast to be obscured by clouds.

3. The method according to claim 1 wherein said processing step further comprises applying a cloud detection algorithm to said acquired data to determine whether said data contains at least said predetermined portion of said desired information.

4. The method of claim 1 wherein said selecting step further comprises selecting said list of targets so that a total volume of data associated with said list of targets for which said desired information is to be acquired exceeds a data storage capacity of said spacecraft.

5. The method according to claim 1 further comprising the step of recording said data in a data storage device.

6. The method of claim 5 further comprising the step of:
    assigning a predetermined priority value to each target on said list of targets;
    acquiring data anticipated to correspond to desired information for each of said targets on said list without regard to priority until a data storage capacity of said spacecraft is exceeded and thereafter discarding said recorded data acquired for any one of said targets if said target has a priority value lower than a priority valued assigned to one of said target for which data is subsequently acquired.

7. A method for increasing an amount of useful data collected by a spacecraft comprising:
    selecting a list of targets for which desired information is to be automatically acquired by said spacecraft;
    acquiring data anticipated to correspond to said desired information for at least one of said targets on said list;
    automatically processing said data on-board said spacecraft to determine whether said data contains at least a predetermined portion of said desired information; and
    wherein said desired information is an RF signal and further comprising the step of acquiring data for targets on said target list where said RF signal is anticipated to potentially have a signal to noise ratio that is too low to allow useful information to be extracted.

8. A method for increasing an amount of useful data collected by a spacecraft comprising:
    selecting a list of targets for which desired information is to be automatically acquired by said spacecraft;
    acquiring data anticipated to correspond to said desired information for at least one of said targets on said list;
    automatically processing said data on-board said spacecraft to determine whether said data contains at least a predetermined portion of said desired information; and
    wherein said processing step is selected from the group consisting of performing a noise reduction algorithm to improve said signal to noise ratio, decoding data associated with said RF signal, and performing a voice recognition analysis, to determine whether said RF signal contains at least said predetermined portion of said desired information.

9. A method for increasing an amount of useful data collected by a spacecraft comprising:
    selecting a list of targets for which desired information is to be automatically acquired by said spacecraft;
    acquiring data anticipated to correspond to said desired information for at least one of said targets on said list;
    automatically processing said data on-board said spacecraft to determine whether said data contains at least a predetermined portion of said desired information; and
    wherein said desired information is an RF signal containing voice data and further comprising the step of acquiring data for targets on said target list where said RF signal is not certain to contain voice data of interest.

10. The method according to claim 9 wherein said processing step includes performing a voice recognition analysis to determine if said signal includes at least one of a voice of an individual of interest and specific words that are of interest.

11. A spacecraft, comprising:
    control processor means responsive to a selected list of targets for controlling said spacecraft to acquire data anticipated to correspond to desired information for at least one of said targets on said list; and data processing means for automatically processing said data on-board said spacecraft to determine whether said data contains at least a predetermined portion of said desired information; and further comprising means for automatically discarding said data if said data does not contain at least said predetermined portion of said desired information.

12. The spacecraft according to claim 11 wherein said desired information is imagery.

13. The spacecraft according to claim 12 wherein said control processor means causes said spacecraft to acquire data for targets on said target list where said imagery is forecast to be obscured by clouds.

14. The spacecraft according to claim 11 further comprising cloud detection means for analyzing said acquired data to determine whether said data contains at least said predetermined portion of said desired information.

15. The spacecraft according to claim 11 wherein a total volume of data associated with said list of targets for which said desired information is to be acquired exceeds a data storage capacity of said spacecraft.

16. The spacecraft according to claim 11 further comprising a solid state recorder storage device wherein said data is recorded.

17. The spacecraft according to claim 11 further comprising a communications receiver for receiving said selected list of targets for which desired information is to be acquired by said spacecraft.

18. A spacecraft, comprising:

control processor means responsive to a selected list of targets for controlling said spacecraft to acquire data anticipated to correspond to desired information for at least one of said targets on said list; and data processing means for automatically processing said data on-board said spacecraft to determine whether said data contains at least a predetermined portion of said desired information;

wherein said desired information is an RF signal and wherein said control processor causes said spacecraft to acquire data for targets on said target list where said RF signal is anticipated to have a signal-to-noise ratio that is possibly too low to allow useful information to be extracted.

19. The spacecraft according to claim 18 further comprising processing means selected from the group consisting of noise reduction means for improving said signal to noise ratio, decoder means for decoding data associated with said RF signal, and voice recognition means for identifying at least one of a voice or a word.

20. A spacecraft, comprising:

control processor means responsive to a selected list of targets for controlling said spacecraft to acquire data anticipated to correspond to desired information for at least one of said targets on said list; and data processing means for automatically processing said data on-board said spacecraft to determine whether said data contains at least a predetermined portion of said desired information; and wherein said desired information is an RF signal and wherein said control processor causes said spacecraft to acquire data for targets on said target list where said RF signal is not certain to contain a voice or data of interest.

21. The spacecraft according to claim 20 wherein said data processing means comprises at least one of voice recognition means to determine if said RF signal carries speech of interest and a data decoder to determine if said RF signal carries data of interest.

22. A spacecraft comprising:

control processor means responsive to a selected list of targets for controlling said spacecraft to acquire data anticipated to correspond to desired information for at least one of said targets on said list; and data processing means for automatically processing said data on-board said spacecraft to determine whether said data contains at least a predetermined portion of said desired information;

wherein said selected list of targets further comprises a predetermined priority value assigned to each target; and wherein said spacecraft acquires data anticipated to correspond to desired information for each of said targets on said list without regard to said priority value until a data storage capacity of said spacecraft is exceeded.

23. A spacecraft, comprising:

control processor means responsive to a selected list of targets for controlling said spacecraft to acquire data anticipated to correspond to desired information for at least one of said targets on said list; and data processing means for automatically processing said data on-board said spacecraft to determine whether said data contains at least a predetermined portion of said desired information; and means for discarding said recorded data acquired for a lowest priority one of said targets after a data storage capacity of said spacecraft is exceeded.

24. A spacecraft, comprising:

a communications receiver for receiving a selected list of targets for which desired information is to be acquired by said spacecraft, control processor means responsive to said selected list of targets for controlling said spacecraft to acquire data anticipated to correspond to said desired information for at least one of said targets on said list;

data processing means for processing said data on-board said spacecraft to determine whether said data contains at least a predetermined portion of said desired information; and means for automatically discarding said data if said data does not contain at least a predetermined portion of said desired information.

25. The spacecraft according to claim 24 wherein said data processing means further comprises cloud detection means.

26. The spacecraft according to claim 25 further comprising means for determining a relative percentage portion of an image not obscured by clouds.

27. The spacecraft according to claim 26 further comprising means for comparing said percentage portion to a threshold value defining said minimum predetermined portion of said desired information.

28. The spacecraft according to claim 24 further wherein said selected list further comprises a predetermined priority value assigned to each target on said list of targets.

29. The spacecraft according to claim 28 wherein said control processor controls said spacecraft to collect data anticipated to correspond to desired information for each of said targets on said list without regard to said priority value until a data storage capacity of said spacecraft is exceeded.

30. The spacecraft according to claim 28 further comprising means for discarding said recorded data acquired for a lowest priority target after a data storage capacity of said spacecraft is exceeded and data is acquired for a higher priority target.

31. The spacecraft according to claim 24 wherein said desired information is an RF signal and wherein said control processor causes said spacecraft to acquire data for targets on said target list where said RF signal is anticipated to have a signal-to-noise ratio that is possibly too low to allow useful information to be extracted.

32. The spacecraft according to claim 31 further comprising processing means selected from the group consisting of noise reduction means for improving said signal to noise ratio, decoder means for decoding data associated with said RF signal, and voice recognition means for identifying at least one of a voice or a word.

33. The spacecraft according to claim 24 wherein said desired information is an RF signal and wherein said control processor causes said spacecraft to acquire data for targets on said target list where said RF signal is not certain to contain a voice or data of interest.

34. The spacecraft according to claim 33 wherein said data processing means comprises at least one of voice recognition means to determine if said RF signal carries speech of interest and a data decoder to determine if said RF signal carries data of interest.

* * * * *